United States Patent [19]

Torrence

[11] Patent Number: 4,841,734
[45] Date of Patent: Jun. 27, 1989

[54] INDICATING REFRIGERANT LIQUID SATURATION POINT

[75] Inventor: Robert J. Torrence, Addison, Ill.

[73] Assignee: Eaton Corporation, Cleveland, Ohio

[21] Appl. No.: 119,009

[22] Filed: Nov. 12, 1987

[51] Int. Cl.[4] ............................................. F25D 17/00
[52] U.S. Cl. ........................................ 62/115; 62/181;
62/228.3; 374/27
[58] Field of Search ........................... 374/16, 27, 183;
73/754; 62/228.3, 181, 183, 115

[56] References Cited

U.S. PATENT DOCUMENTS

| | | | |
|---|---|---|---|
| 2,753,693 | 6/1955 | Zearfoss, Jr. | 62/4 |
| 3,226,943 | 1/1966 | Mitchell | 62/227 |
| 3,289,429 | 12/1966 | Beard | 62/183 |
| 3,491,546 | 1/1970 | Holzer | 62/115 |
| 3,537,272 | 11/1970 | Hales | 62/157 |
| 3,698,204 | 10/1972 | Schlotterbeck et al. | 62/206 |
| 3,735,603 | 5/1973 | Hamilton | 62/210 |
| 3,777,240 | 12/1973 | Neill | 318/471 |
| 4,167,858 | 9/1979 | Kojima et al. | 62/126 |
| 4,286,438 | 9/1981 | Clarke | 62/216 |
| 4,395,886 | 8/1983 | Mayer | 62/160 |
| 4,459,819 | 7/1984 | Hargraves | 62/212 |
| 4,471,632 | 9/1984 | Nishi et al. | 62/208 |
| 4,474,022 | 10/1984 | Ruskar | 62/96 |
| 4,478,051 | 10/1984 | Ibrahim | 62/212 |
| 4,480,443 | 11/1984 | Nishi et al. | 62/227 |
| 4,485,635 | 12/1984 | Sakano | 62/209 |
| 4,490,987 | 1/1985 | Peterson | 62/186 |
| 4,498,311 | 2/1985 | Sakano | 62/227 |
| 4,499,739 | 2/1985 | Matsuoka | 62/212 |
| 4,506,518 | 3/1985 | Yoshikawa et al. | 62/180 |
| 4,510,763 | 4/1985 | Johnson | 62/115 |
| 4,523,435 | 6/1985 | Lord | 62/212 |
| 4,527,399 | 7/1985 | Lord | 62/212 |
| 4,537,042 | 8/1985 | Nishi et al. | 62/208 |
| 4,548,047 | 10/1985 | Hayoshi et al. | 62/160 |
| 4,571,951 | 2/1986 | Szymaszek | 62/212 |
| 4,578,960 | 4/1986 | Nishi et al. | 62/196.3 |
| 4,614,087 | 9/1986 | Nadamoto et al. | 62/126 |
| 4,621,503 | 11/1986 | Woods et al. | 62/228.3 |
| 4,628,700 | 12/1986 | Alsenz | 62/152 |
| 4,646,535 | 3/1987 | Matsuoka et al. | 62/228.5 |

FOREIGN PATENT DOCUMENTS

| | | |
|---|---|---|
| 0147356 | 7/1985 | European Pat. Off. |
| 0171240 | 2/1986 | European Pat. Off. |
| 2316558 | 1/1977 | France |
| 2168467 | 6/1986 | United Kingdom |

Primary Examiner—William E. Wayner
Attorney, Agent, or Firm—R. A. Johnston

[57] ABSTRACT

A refrigerant control system employing a "self-heated" thermistor disposed in the high pressure refrigerant line to sense refrigerant temperature from the condenser as it enters the expansion valve or capillary. The voltage drop is detected across a resistor in series with the thermistor and converted to saturation pressure from known refrigerant properties. A microprocessor de-energizes the compressor and turns on the condenser fan when excessive saturation pressure is detected. An optional second thermistor senses actual refrigerant temperature for comparison with the saturation temperature to determine sub-cooling and the microprocessor disables the compressor in the event of excessive or insufficient sub-cooling.

14 Claims, 4 Drawing Sheets

_Fig. 6_

_Fig. 7_

INDICATING REFRIGERANT LIQUID SATURATION POINT

BACKGROUND OF THE INVENTION

The present invention relates to refrigeration systems for air cooling a compartment and in particular, relates to air conditioning systems for vehicles. Systems of this type typically have refrigerant pumped by a compressor into an exothermic heat exchanger, or condenser, for liquification and expanded for flow through an endothermic heat exchanger, or evaporator, located in the compartment to be cooled and returned to the compressor in the form of gas or vapor. Vehicle passenger compartment air conditioning systems typically utilize a compressor energized by an electrical clutch connecting the compressor to the engine. In operation of modern vehicle air conditioning systems, it has been found necessary during low road speed operation of the vehicle to provide cooling fan for directing a flow of ambient air over the condenser; and, it has further been desirable to provide such a fan which is electrically energizable independently of the vehicle engine speed.

In vehicular air conditioning systems employing an electrically clutched compressor and electrically operated condenser fan, it has been desired to provide suitable sensing or warning for declutching the compressor in the event of excessive sub-cooling of the liquid refrigerant, loss of refrigerant or an overpressure condition in the high pressure liquid side of the system.

Heretofore, protection against excessive sub-cooling and overpressure or loss of refrigerant has been provided by pressure sensors or transducers disposed in the liquid refrigerant line to detect the pressure in the line. These pressure sensing devices have proven to be costly and also have exhibited a history of reliability problems. It has become increasingly necessary to provide improved control of engine ignition, fuel feed and in order to meet stringent emission requirements; and, therefore, the trend has been toward all-electrical control of engine operating parameters, including engine operated accessories, such as air conditioning. In attempting to provide all electrical control of vehicle air conditioning, and particularly malfunction alarm and shut-down, it has been difficult to combine the pressure measurements with measurements of temperature in other portions of the refrigerant system for providing integrated electrical control of the entire system.

Thus, it has been long desired to provide a way or means of providing overall control of the refrigerant system including high pressure and excessive sub-cooling warning by means of sensing only refrigerant temperature. This has proven to be difficult, inasmuch as sensing the actual temperature of the refrigerant does not permit the determination of the pressure in the refrigerant line. Thus, it has been desired to provide a way or means of electrically controlling a refrigerant system and providing warning in the event of excessive or low pressure in the refrigerant without the necessity of providing pressure sensors.

SUMMARY OF THE INVENTION

The present invention provides a unique and novel way of sensing the condition of excessive or low refrigerant charge, and insufficient or excessive refrigerant pressure for providing an electrical control signal to cycle the condenser fan and disable the compressor clutch. The present invention employs a saturation temperature sensing thermistor disposed in the refrigerant line in the high side, or upstream of the expansion valve means. An electrical current is applied to the thermistor to heat the thermistor a sufficient amount to cause boiling of refrigerant on the surface thereof thus bringing the temperature of the thermistor to the saturation temperature of the refrigerant. A resistance is provided in series with the thermistor and the voltage drop across the resistor is measured, for a predetermined thermistor heating current, as the voltage in the thermistor changes responsive to change in saturation temperature of the refrigerant. The thermistor thus measures saturation temperature which may be converted to saturation pressure from known properties of the refrigerant.

During normal operation the fan is energized at a predetermined saturation temperature, and de-energized when the temperature falls below a second predetermined saturation temperature.

When an excessive high pressure condition is detected, the microcomputer generates a signal to de-energize the condenser fan and de-energize the compressor clutch. In another embodiment of the invention, a second thermistor disposed adjacent the heated thermistor for sensing the actual temperature of the liquid in a refrigerant line. Comparison of the actual temperture and the saturation temperature enables the amount of sub-cooling to be calculated; and, an electrical signal is generated for disabling the compressor clutch in the event of excessive or insufficient sub-cooling.

DETAILED DESCRIPTION

Figure 1:
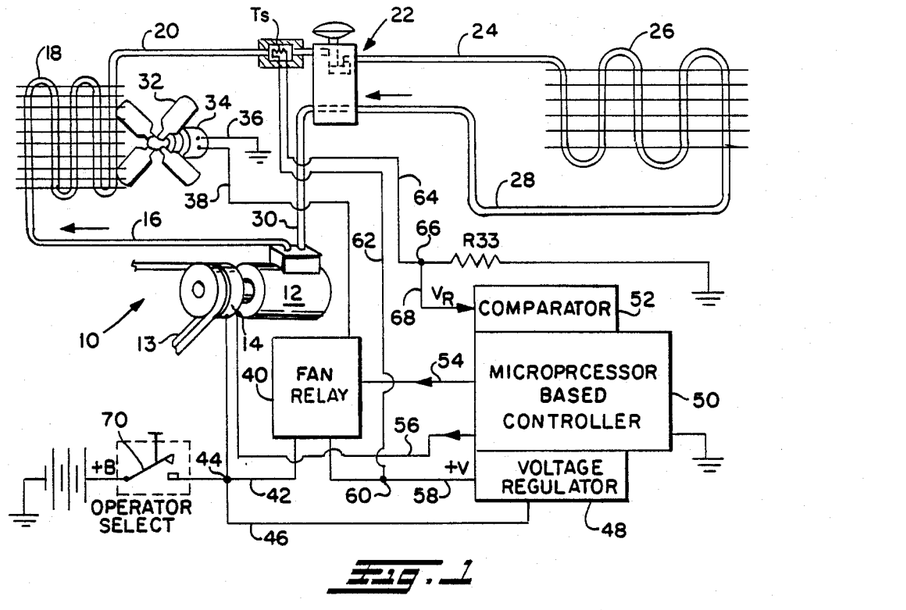
FIG. 1 is a schematic of an air conditioning system for a vehicle illustrating the placement of the heated thermistor for sensing saturation temperature of the liquid refrigerant on the high pressure side of the mechanical expansion valve means.

Referring to FIG. 1, the control system of the present invention is indicated generally at 10 as having a compressor 12 energized by an electrically operated clutch 14 powered by a belt 13 a be driven from the vehicle engine. Refrigerant is Pumped from the compressor 12 via conduit 16 through an exothermic heat exchanger or condensor 18 via conduit 20 to the inlet of an expansion means indicated generally at 22. In the embodiment of FIG. 1, the expansion means comprises a mechanically operated valve of the type employing a temperature responsive capsule operating a diaphragm for movement of the valve poppet, which valves are well known in the art. The low pressure discharge from the expansion valve means 22 flows through conduit 24 and through an endothermic heat exchanger or evaporator 26 and is evaporated and returned via conduit 28 through a passage in the valve 22 and conduit 30 to the inlet of the compressor.

A thermistor $T_S$ is disposed in the conduit 20 adjacent the inlet of the expansion means 22 for sensing the saturation temperature of the liquid refrigerant entering the expansion valve. An electrically operated blower or fan 32 is disposed adjacent the condenser 18 for directing a flow of ambient air thereacross upon electrical energization of the fan motor 34. One power lead 36 of the motor 34 is grounded and the remaining lead 38 is connected to the power output of a fan relay 40. The remaining power lead 42 of the fan relay is connected to the vehicle 12 volt supply via junction 44.

Junction 44 also is connected to the input of a voltage regulator 48 (via lead 46) which supplies power to the microprocessor based controller 50. Controller 50 receives signal inputs from comparator 52 and provides a signal output to the fan relay 40 along line 54 and switches power to the compressor clutch 14 along line 56. Saturation thermistor $T_S$ has applied thereto via lead 58, a voltage from the voltage regulator indicated generally +V, junction 60 and lead 62. The remaining lead from 64 of $T_S$ is grounded through calibration resistor R33. The voltage drop across resistor R33 is detected at junction 66 and is applied through lead 68 to the comparator 52.

A suitable line power enabling switch 70 is provided for applying vehicle battery power to junction 44. The switch 70 is adapted for remote selective actuation by the vehicle operator, as for example by instrument or dash panel mount, for initiating operation of the refrigeration system.

In the presently preferred practice, $T_S$ is an NTC thermistor manufacture Fenwall Electronics, 63 Fountain Street, Farmingham, Mass. 01701 and has identification FD21J1-W and has a resistance of 100 ohms at 25° C.

Figure 2:
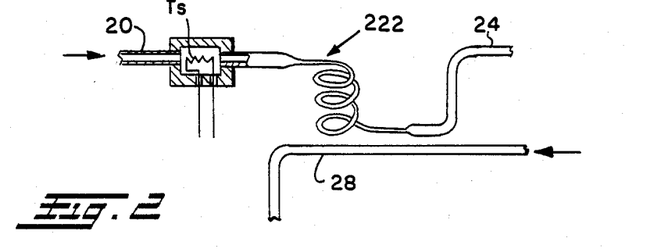
FIG. 2 is a schematic of a portion of FIG. 1 illustrating an alternative capillary tube expansion means.
Figure 3:
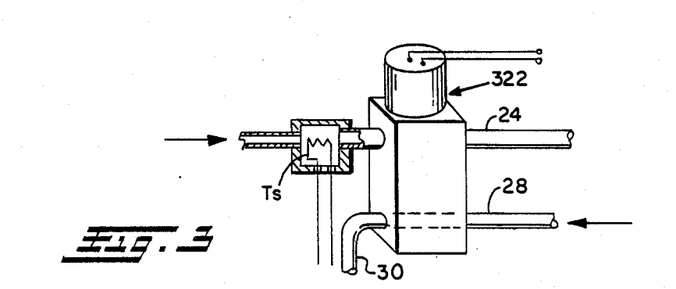
FIG. 3 is a schematic of a portion of the system for FIG. 1 illustrating an electrically controlled expansion valve.

Referring now to FIG. 2, an alternate form of the system of FIG. 1 is illustrated wherein the refrigerant expansion means 222 comprises a coiled capillary tube. Referring to FIG. 3, another embodiment of the invention of FIG. 1 is illustrated wherein the expansion means comprises an electrically operated expansion valve 322 which may be of the type having a solenoid energized by a pulse-width-modulated control signal such as that described in co-pending application serial number 007,147 filed Jan. 27, 1987 assigned commonly to the assignee of the present application. The conduit connections and the disposition of the saturation temperature sensor $T_S$ are otherwise the same for the embodiments of FIGS. 2 and 3 as the embodiment of FIG. 1

Figure 4:
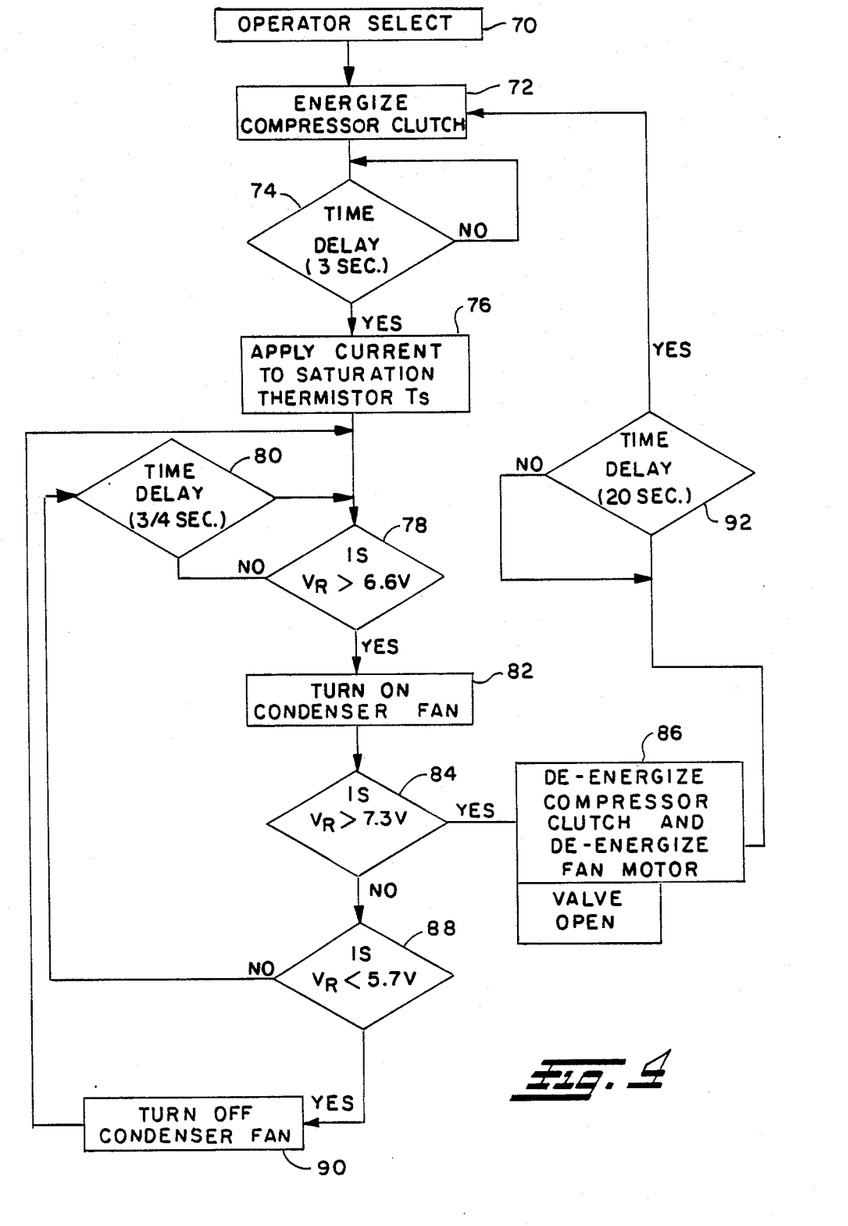
FIG. 4 is a flow diagram of the electrical control signal generation for the system of FIG. 1.
Figure 5:
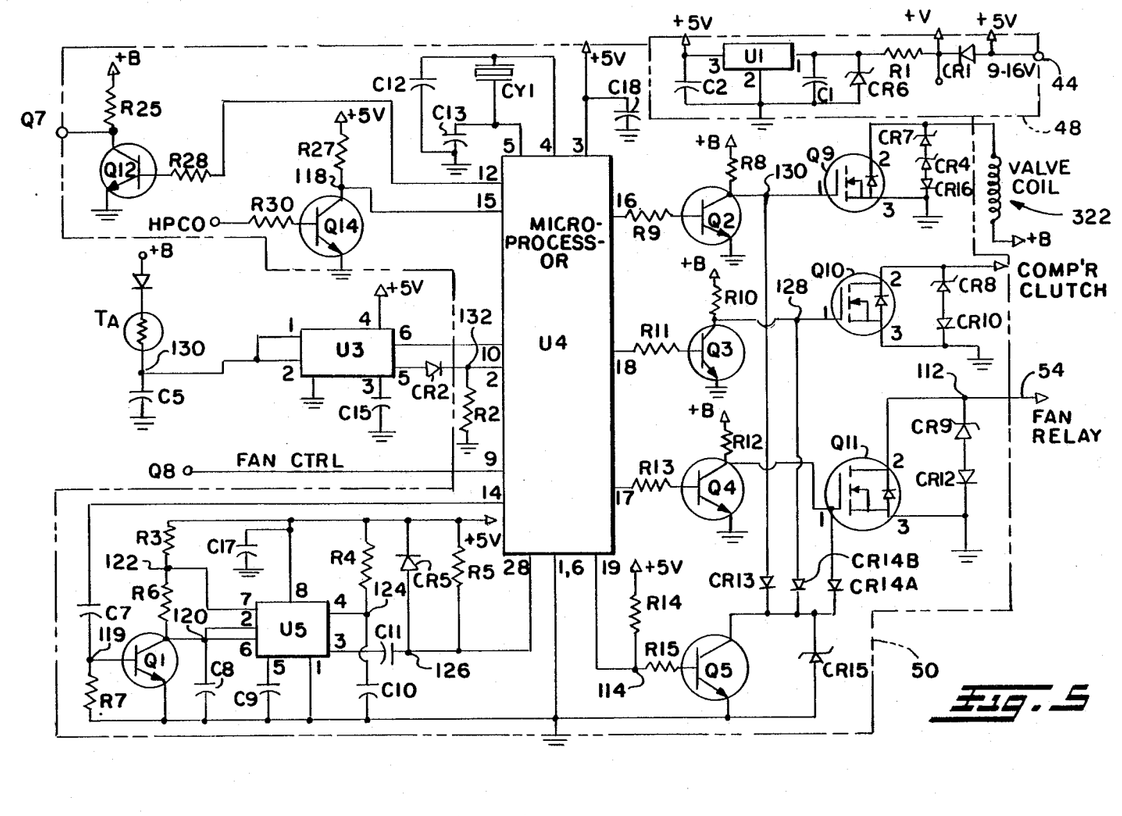
FIG. 5 is an electrical schematic for the microprocessor based controller of FIG. 4.
Figure 6:
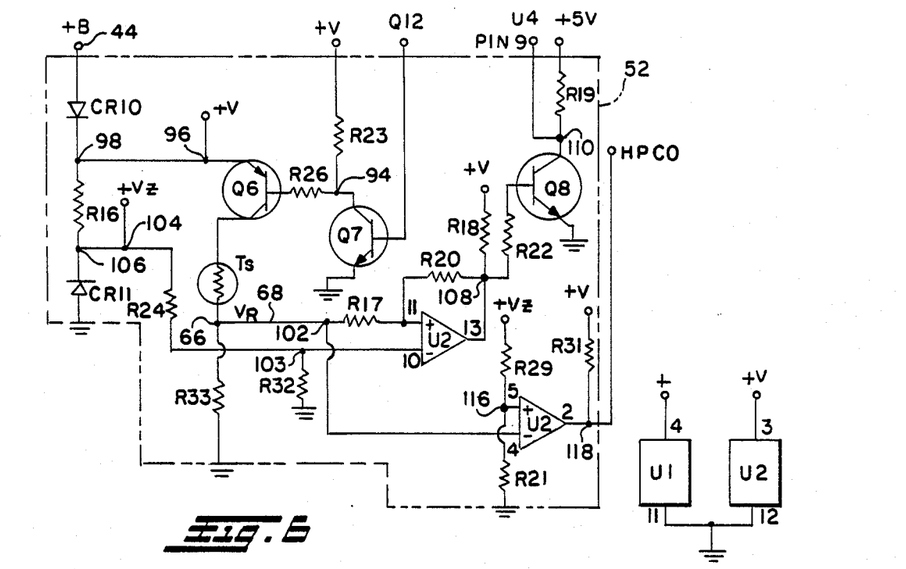
FIG. 6 is an electrical schematic of the circuit for conditioning the signal from the heated thermistor for the controller of FIG. 5; and, FIG. 7 is a portion of the schematic for an alternate embodiment of the invention employing a second thermistor in the high pressure line for sensing actual liquid refrigerant temperature.

Referring now to FIGS. 4, 5 and 6, closure of the switch 70 enables operator selective initiation of the system to energize the compressor at step 72. When a suitable time delay has occurred, typically three seconds, the controller 50, is operable to energize the saturation thermistor $T_S$ at step 76. The controller 50 then monitors the voltage drop across resistor R33 and compares the volta across resistor R33 with a reference voltage typically 6.6 volts in the comparison step 78. When a suitable time delay, preferably three-fourth second, has occurred at step 80, the comparison function is repeated. Otherwise, if $V_R$ is greater than 6.6 volts, the condenser fan motor 34 is energized at step 82.

When the voltage drop $V_R$ rises to a predetermined limit, typically 7.3 volts, the comparator is operative at step 84 to de-energize the compressor clutch and the fan motor at step 86. If an electrically operated valve such as valve 322 (FIG. 3) is employed in the system of FIG. 1, step 86 is also operable to open or maintain open the valve 322 to permit system pressure equalization after shut down. If the comparison at step 84 determines that has not exceeded the limit of 7.3 volts and so long as $V_R$ does not drop below a predetermined lower limit, typically 5.7 volts, the compressor will remain energized; and, after the three quarter second time delay in step 80, the comparison of step 78 will be repeated In the event that the voltage drop $V_R$ falls below the lower limit of 5.7 volts, determined by comparison step 88, the controller 50 is then operable in step 90 to disable power to the condenser fan motor 34.

In the event that $V_R$ has been detected in step 84 as greater than the upper limit 7.3 volts, and the system has been de-energized in step 86, and after a suitable time delay determined in step 92, typically 20 seconds, the controller is operable to re-energize the compressor clutch at step 72.

Referring to FIG. 5, the microprocessor U4, which in the presently preferred practice comprises a solid state device bearing manufacturer's designation 6805P2 available from Motorola Semiconductor Products, 2060 Algonquin Rd., Schaumburg, IL, 60195 receives power at pin 3 thereof from the voltage regulator 48. The regulator preferably comprises a solid state device U1 bearing manufacturer's designation MC7805 available from the said Motorola, which receives at pin 1 thereof, a volta from the vehicle battery, typically nine to sixteen volts, through diode CR1 and resistor R1. Protective devices comprising capacitor C1 and zener diode CR6 in parallel protect the input from transient spikes and are grounded along with pin 2 of U1. A capacitor C2 is disposed across the output pin 3 of U1, which output gives a regulated five volts to the input at pin 3 of the processor U4. The processor U4 is operative on power up to provide at output pin 12 a signal through resistor R28 to Q12, which is biased by the vehicle battery voltage $V_B$ through resistor R25 at its collector. When the signal from pin 12 of the processor U4 switches Q12 OFF and the voltage $V_B$ is applied to base of Q7.

Referring to FIG. 6, when the voltage $V_B$ is received at the base of Q7, Q7 conducts and drops the voltage at junction 94 which is biased through resistor R23 positive from the voltage regulator 48. When the voltage at junction 94 is dropped, the base of Q6 is biased low through resistor R26, and Q6 is caused to conduct current from junction 96 which is biased positive by voltage from regulator 48 and also a voltage from junction 98. Current flowing through Q6 flows through thermistor $T_S$ and calibration resistor R33 to ground. $T_S$ is thus heated to a temperature sufficient to boil the liquid refrigerant flowing thereover by a limited current therethrough; and, variations in the temperature are sensed by detecting changes in the voltage drop across resistor R33 as $V_R$ measured at junction 66. $V_R$ is applied to junction 102 and through resistor R17 to the positive input pin 11 of device U2 which comprises in the presently preferred practice a dual comparator device bearing manufacturer's designation LM339 available from National Semiconductor Corp. 2900 Semiconductor Drive, Santa Clara, Calif. 95051. The negative input pin 10 of U2 receives a voltage through resistor R24 from junction 104 which is biased by a positive voltage $V_Z$ from regulator 48 and also battery voltage through resistor R16 from junction 106 which is connected to ground through reverse biased diode CR11. A resistor R24 is connected to pin 10 of U2 and is grounded such that R24 and R32 comprise a divider to apply a regulated reference voltage to pin 10 of U2. When $V_R$ exceeds 6.6 volts, the output of comparator U2 at pin 13 goes high and is applied to junction 108 which is biased by a voltage from the regulator 48 through resistor R18. The voltage at junction 108 is applied through resistor R22 to the base of Q8 such that when the output of U2 is high Q8 is turned ON and the output thereof applied to collector junction 110, which is biased through resistor R19 at five volts and is applied to pin 9 of the microprocessor U4.

Referring to FIG. 5, when the input to pin 9 of U4 goes low, the output at pin 17 provides a signal through resistor R13 to the base of Q4 which turns OFF leaving a positive bias of the battery voltage through resistor R12 to the collector terminal thereof, which voltage is applied to the base of power FET Q11, causing Q11 to conduit at its output pin 2 to junction 112 which is connected to fan relay 40 along lead 54. The output of Q11 at junction 112 is protected by zener diode CR9 and diode CR12 which are grounded along with pin 3 of Q11. The output of Q4 is similarly protected at pin 1 of Q11 by diode CR14A which is switched to ground by Q5 which has its base biased through resistor R15 and R14 by a voltage from the regulator 48. A junction 114 between resistors R14 and R15 is signaled by an output at pin 19 of U4 to turn Q5 ON to ground the output of Q4 during power up.

Referring to FIGS. 5 and 6, when $V_R$ at pin 11 of U2 is less than a lower limit voltage level, typically 5.7 volts, Q8 is turned OFF and the voltage at pin 9 of U4 goes high (positive 5 volts) and the output at pin 17 turns Q4 ON grounding the output thereof and turning Q11 OFF to cut off the voltage to the fan relay thereby disabling fan motor 34.

Referring to FIG. 6, $V_R$ at junction 102 is also applied to negative pin 4 of another half of device U2; and, the positive input of comparator U2 at pin 5 thereof, is connected to junction 116 which is grounded through resistor R21 and receives a positive bias $V_Z$ through R13. The output of comparator U2 at pin 2 is applied to junction 118 which receives a positive voltage bias through resistor R14 from the voltage regulator 48.

Referring to FIG. 5, the output of U2 at junction 118 denoted HPCO in FIG. 5 is applied through resistor R30 to the base of Q14 which has its emitter grounded and its collector output connected through junction 118. Junction 118 is biased through resistor R27 by a positive five volts from regulator 48 and is connected to input pin 15 of microprocessor U4.

Referring to FIG. 6, the input to pin 5 of comparator U2 from junction 116 is maintained at a positive regulated voltage, typically 7.3 volts by the voltage divider resistors R19, R21. When the voltage on pin 4 drops below the voltage on pin 5, namely 7.3 volts, the output of U2 goes high turning Q14 OFF which causes a positive 5 volts from junction 118 to be applied to pin 15 of U4 and the output at pin 18 of U4.

Referring to FIG. 5, device CY1 is an oscillator in series to ground with capacitor C13 and in parallel with capacitor C12. CY1 is connected to pins 5 and 4 of microprocessor U4 for providing timing pulses preferably on the order of 4 megahertz.

Controller 50 includes a "dead man" timer which monitors the microprocessor function. U4 provides an output on pin 14 thereof through capacitor C7 to junction 119 which is connected to the base of Q1 and to ground through resistor R7. Q1 has the emitter grounded and the collector junction connected to junction 120 which is connected to pin 6 of device U5 which comprises a Fenwall NE555D timer. U5 also has pin 6 connected to junction 120, pin 5 grounded through capacitor C9 and pin 1 grounded. Pin 7 of U5 is connected to junction 22 which is biased through resistor R3 with a positive voltage from the regulator 48; and, the voltage of junction 122 is also applied through resistor R6 to the collector junction of Q1 Pin 4 of U5 is connected to junction 124 which is grounded through capacitor C10 and junction 124 also is biased by a positive voltage through resistor R4. The output at pin 3 of U5 is connected through capacitor C11 to junction 126, which is biased through resistor R5 by positive five volts from the regulator 48, and is protected by diode CR5 and is connected to input 28 of the microprocessor U4.

The device U5 is operative such that if a signal is not received from pin 14 to Q1, after 70 milliseconds, U5 is not reset by Q1 and provides a reset signal through pin 28 to the microprocessor U4.

When the microprocessor is operative to provide an output signal at Pin 18, the signal is applied through resistor R11 to the base of Q3 which has its emitter grounded. The collector junction of Q3 is biased to a positive voltage from the battery through resistor R10 and is connected through junction 128 to the base or pin 1 of power FET device Q10. The output at pin 2 of Q10 is connected to the compressor clutch; and, the output at pin 3 of Q10 is grounded, with the outputs protected by zener diode CR8 connected to pin 2 and diode CR10 connected to output pin 3. When a signal is received from pin 18 of U4 to the base of Q3, Q3 conducts thereby dropping the voltage on junction 128 and turning power FET Q10 OFF thereby de-energizing the compressor clutch.

Similarly, an output from pin 16 of U4 is applied through resistor R9 to the base of device Q2 which has its emitter grounded and its collector junction biased to a positive voltage from the battery through resistor R8 and connected to junction 130. Junction 130 is connected to input pin 1 or base of power FET Q9 which has its output pin 3 grounded and output pin 2 connected to the coil of refrigerant valve 22 for the embodiment of FIG. 3. The outputs are protected by zener diodes CR7, CR4 and diode CR16. When a signal is received from U4 pin 16 to the base of Q2, Q2 conducts, thereby dropping the voltage to junction 130 and turning Q9 OFF, thereby disabling the valve coil for turning the valve OFF.

Figure 7:
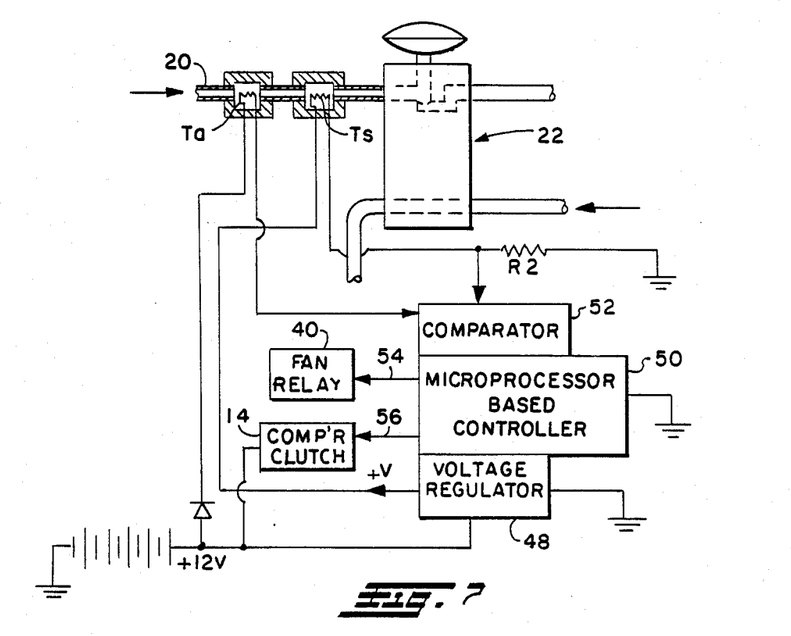

Referring now to FIG. 7, the control system of the present invention is shown with an optional thermistor $T_A$ disposed in the liquid refrigerant line closely adjacent the saturation temperature thermistor $T_S$ for sensing the actual temperature of the liquid refrigerant in the line. With reference to FIG. 5, $T_A$ receives a positive battery voltage through a diode with the remaining lead connected to a junction 130 which is connected through capacitor C5 to ground and also to input pin 2 of a device U3. In the presently preferred practice U3 comprises a Fenwall NE5560 timer which receives a positive five volts from the regulator 48 at pin 4, with pin 7 grounded and pin 3 grounded through capacitor C15. A signal from the microprocessor pin 10 is applied to pin 6 of U3 and triggers U3 to discharge capacitor C5. When the voltage on pins 1 and 2 of U3 from junction 130 reach two-thirds of the bias voltage, U3 applies a signal through its output pin 5 and diode CR12 to junction 132 which is connected to input pin 2 of U4 and also grounded through resistance R2.

The microprocessor U4 measures the time to receive the signal, the time measurement giving a digital representation of the voltage on $T_A$. The microprocessor can then look up the temperature of $T_A$ from a table of voltages and resistances provided by the manufacturer of the thermistor $T_A$. In the presently preferred practice, $T_A$ is a 30 kohm NTC thermistor available from Fenwall bearing manufacturer's designation UUR43J21.

The actual temperature sensed by $T_A$ can then be employed to determine the sub-cooling of the system according to the equation "Sub-Cooling $= T_S - T_A$".

When the sub-cooling preferably exceeds more than 75° F. degrees, this indicates that there is an overcharge. If the sub-cooling is zero, this provides an indication that there is insufficient refrigerant in the system to provide proper cooling; and, the operator can be alerted to turn off the system in either case. The microprocessor then provides a signal on output pins 17 and 18 to de-energize the condenser fan and the compressor clutch to disable the system. In the event that an electrically operated expansion valve such as valve 322 of FIG. 3 is employed, the microprocessor would also provide an output signal at pin 16 to disable the valve coil. This is accomplished by a signal through R9 to the base of Q2 which conducts to ground the voltage bias from the battery through R8 at its collector which is connected to junction 130 and base of power FET Q9. Q9 is then caused to turn OFF cutting current flow to the valve coil. The output of Q9 is protected by zener CR7 and diodes CR4 and CR16.

The values of the resistors, capacitors and diode designations are given in table I.

TABLE I

| Resistance OHM | Capacitances Microfarads | Diodes and Other |
|---|---|---|
| R1-56 | C1 10, 35 V | CR1 GL41D |
| R2-10K | C2 .1, 50 V | CR2 MMBD914 |
| R3-100K | | CR3 |
| R4-30K | CR-1 | CR4 IN5349 12 V, 5 W |
| R5-10K | C5-.1 | CR5 MMBD 914 |
| R6-1K | | CR6 MLL 4145, 19 V, 1 W |
| R7-1K | C7-.01 | CR7 IN5349, 12 V, 5 W |
| R8-1K1 | C8-.1 | CR8 IN5352, 24 V, 5 W |
| R9-2.2K | C9-.01 | CR9 MLL4745 |
| R10-1K | C10-2.2 | U1 MCT805 |
| R11-2.2K | C11-2.2 | U2 LM 339 |
| R12-1K | C12-18 pico | U3 NE556D |
| R13-2.2K | C13-18 pico | U4 M6805P2 |
| R14-10K | | U5 NE555D |
| R15-2.2K | C15-.01 | Q1 2N3904 |
| R16-100 | | Q2 2N3904 |
| R17-10K | C17-.1 | Q3 2N3904 |
| R18-2.7K | C18-.1 | Q4 2N3904 |
| R19-4.7K | | Q5 2H3304 |
| R20-6.8K | | Q6 2N6710 |
| R21-7.3K | | Q7 2N3904 |
| R22-10K | | Q8 2N3904 |
| R23-10K | | Q9 BFS130 |
| R24-12K | | Q10 BFS130 |
| R25-4.7K | | Q11 BFS 130 |
| R26 470 | | Q12 2N3904 |

TABLE I-continued

| Resistance OHM | Capacitances Microfarads | Diodes and Other |
|---|---|---|
| R27-4.7K | | Q14 2N3904 |
| R28-2.2K | | CR10 1N4002 |
| R29-2.7K | | CR11 10 V, 1 W |
| R30-2.2K | | CR12 SL411 |
| R31-2.2K | | CR13 MMBD914 |
| R32-2.2K | | CR14 MMBD283B |
| R33-13 | | CR15 MLL4346, 18 V, 1 W |
| | | CR16 GL41D |

The procedure for determining the value of the calibration resistor R33 will now be described wherein the thermistor $T_S$ is placed in the desired location in the refrigerant line and a digital pressure transducer is disposed temporarily in the system and the system is operated with logging of the pressure transducer output and the voltage drop $V_R$. The data logger is fed into a computer which is programmed to perform the calculation to determine the resistance of the thermistor from the following equation:

$$R_t = R(V - V_r/V_r)$$

where $R_t$ is the resistance of $T_S$, R is the resistance of R33 and V is the supply voltage.

The computer then calculates the temperature of the thermistor $T_S$ by using the temperature/resistance values supplied by the thermistor manufacturer and which are set forth in Table II below:

TABLE II

| °F. | °C. | R-T Curve | Alpha Temp. Coeff. | Resis. Dev. |
|---|---|---|---|---|
| −76 | −60 | 49.10 | 6.0 | 9.7 |
| −58 | −50 | 27.54 | 5.6 | 8.2 |
| −40 | −40 | 16.08 | 5.2 | 6.8 |
| −22 | −36 | 97.03 | 4.9 | 5.5 |
| −4 | −20 | 6.053 | 4.5 | 4.4 |
| 14 | −10 | 3.890 | 4.3 | 3.3 |
| 32 | 0 | 2.568 | 4.0 | 2.3 |
| 50 | 10 | 1.731 | 3.8 | 1.3 |
| 68 | 20 | 1.194 | 3.6 | 0.3 |
| 77 | 25 | 1.00 | 3.5 | 0.0 |
| 86 | 30 | .8413 | 3.4 | 0.6 |
| 104 | 40 | .8040 | 3.2 | 1.4 |
| 122 | 50 | .4412 | 3.1 | 2.4 |
| 140 | 60 | .3275 | 2.9 | 3.1 |
| 158 | 70 | .2468 | 2.8 | 3.7 |
| 176 | 80 | .1856 | 2.7 | 4.4 |
| 194 | 90 | .1460 | 2.6 | 5.1 |
| 212 | 100 | .1140 | 2.5 | 5.7 |

R-T: multiply resistance at 25° C. by listed valve to obtain resistance at temperature.

Alpha temperature coeff: denotes percent in resistance change per ° C. at a specific temperature.

Resistance Deviation: add to resistance tolerance at reference temperature (250° C.) to give complete percentage of resistance deviation.

The computer then calculates the equivalent system pressure based on the assumption that the heated thermistor has measured saturation temperature. The saturation pressure/temperature relationship is known and is defined for each refrigerant by the various manufacturers; and, for freon 12 the following relationship is used:

$$P = 9.1473 + 50688*T + 4.13189609*T^2 + 1.451827638E^{-5}*T^3 + 1.14699897E^{-8}*T^4;$$

where P = the pressure (psig) and T = the saturation temperature (degrees F).

The thermistor temperature based upon resistant measurement may also be computed from the following $T = (3508.96) - \log(100/R_T) * 1.1 + 11.79611) - 273.15) * 1.8 + 32;$ Where T = temperature of the thermistor (degrees F) and $R_T$ = resistance of the thermistor ohms.

The actual pressure obtained from the calibration pressure transducer output and the calculated system pressure derived from $T_S$ are plotted against time as the system loads are randomly varied. If the pressure correlates throughout the test, then the value of the limit resistor R33 selected is correct. If the calculated system pressure is lower than the actual transducer, then the value of the- resistor R33 is too high which unduly limits the wattage to the thermistor $T_S$ and fails to maintain surface boiling of the refrigerant contacting the thermistor. If the calculated pressure is higher than the actual pressure measured by the transducer, then the value of the resistor R33 is too low, which means excessive wattage (current) has been applied to the thermistor. The process of iteration is continued with new values of R33 substituted until the pressure calculated correlates with the actual pressure measured under the range of service conditions anticipated. It has been found that the final selection of resistor R33 yields a 60 psig offset in pressure between the actual pressure measured by the transducer and the pressure calculated from $T_S$ over the range of expected service conditions. This offset can be nulled or zeroed out of the software to provide the desired correlation over the operating range of the system.

When the value of the resistor R33 has been determined a correlation can be made between the voltage $V_R$ across the current limiting resistor R33 and the saturation temperature derived from $T_S$. This correlation of values can be programmed into microprocessor U4 such that $T_S$ can be found for a given input for $V_R$.

The present invention thus employs a novel technique or way of determining whether a condition of over-pressure, under-pressure, overcharge or insufficient charge of refrigerant is present in an automotive air conditioning system by the use of inexpensive thermistors in the refrigerant line and without the need of costly pressure transducers. The system of the present invention employs a heated thermistor in the liquid refrigerant line on the high pressure side of the expansion means, or expansion valve, which enables a calculation to be made of the saturation pressure based upon the assumption that saturation temperature has been measured. An optional auxiliary thermistor is employed to measure the actual temperature of the refrigerant and a comparison of the saturation temperature measured by the heated thermistor with the actual temperature is used to determined the degree of sub-cooling from which a condition of normal or abnormal refrigerant charge may be deduced. In the event of abnormal refrigerant charge, the system is alarmed to automatically disable the refrigerant compressor and condenser fan. During normal operation, the heated thermistor is employed for sensing saturation temperature and a derived saturation pressure enables the system to determine whether a normal or abnormal condition of refrigerant pressure exists; and, in the event of an abnormal, either too high or too low refrigerant pressure condition, the system is automatically operative to disable the compressor and enable condenser fan and to reenable the compressor when the abnormal pressure condition is dissipated.

The present invention thus provides a simple and economical refrigeration control system employing only thermistors in the refrigerant line to provide alarm notification of high or low refrigerant pressure and optionally high or low refrigerant charge and automatically disable the compressor and condenser fan. The control system of the present invention may be employed with a refrigerant expansion means comprising any of three types; namely, a simple capillary tube, a mechanical pressure/temperature expansion control valve employing a pressure sensitive diaphragm for controlling valve poppet movement or an electrically operated expansion valve.

Although the invention has been hereinabove described with respect to the illustrated embodiments and the presently preferred practice, it will be understood that the invention is capable of modification and variation and is therefor limited only by the following claims.

I claim:

1. A compressor cut-out and condensor fan cycling system for controlling refrigerant flow between an exothermic and an endothermic heat exchanger comprising:
   (a) pump means operable upon energization to compress said refrigerant and discharge same under pressure;
   (b) conduit means operatively connecting the discharge of said pump means through said exothermic heat exchanger and said endothermic heat exchanger and return to the intake of said pump means to said endothermic heat exchanger;
   (c) expansion means disposed in said conduit means and operative to control flow of refrigerant between said exothermic heat exchanger and said endothermic heat exchanger;
   (d) a saturation thermistor disposed in said conduit between said exothermic heat exchanger and said expansion means for sensing the temperature of said refrigerant on the high pressure side of said expansion means;
   (e) resistance means in series electrically with said thermistor;
   (f) circuit means operable to effect a flow of current through said resistance means and said thermistor sufficient for effecting boiling of said refrigerant on said thermistor and including means operable to detect the voltage drop across said resistance means upon said flow of current;
   (g) fan means operable upon electrical energization to direct a flow of coiling air over said exothermic heat exchanger;
   (h) controller means operable in response to said voltage detection to energize said fan means when said detected voltage is greater than a first predetermined level and operable to de-energize said pump means when said detected voltage is greater than a second predetermined level.

2. The system defined in claim 1, wherein said expansion means comprises an electrically operated expansion valve.

3. The system defined in claim 1, wherein said expansion means comprises a capillary tube.

4. The system defined in claim 1, wherein said expansion means comprises a temperature and pressure responsive diaphragm operated control valve.

5. The system defined in claim 1, wherein said first predetermined voltage level is established at about six and six-tenths (6.6) volts.

6. The system defined in claim 1, wherein said second predetermined level is established at about seven and three-tenths (7.3) volts.

7. The system defined in claim 1, wherein said controller means is further operative to de-energize said fan means when said voltage drop across said resistance means is less than said first level by a predetermined differential.

8. The system defined in claim 1, wherein said controller means is further operative to re-energize said pump means at a predetermined time interval after de-energization.

9. The system defined in claim 1, further comprising:
(a) a second thermistor disposed in said conduit at generally the same station as said saturation thermistor;
(b) circuit means for providing a voltage signal indicative of the change in resistance of said second thermistor responsive to changes in the actual temperature of said refrigerant; and,
(c) means operable to compare said second thermistor voltage signal with said detected voltage and de-energize said pump means when said comparison exceeds a third predetermined value or is less than a fourth predetermined value.

10. A method of controlling a refrigeration system of the type having a pump operable upon energization for circulating refrigerant between an exothermic heat exchanger and endothermic heat exchanger and a fan for directing air flow over said exothermic heat exchanger comprising the steps of:
(a) providing expansion means for controlling flow of refrigerant from said exothermic heat exchanger to said endothermic heat exchanger; and,
(b) providing a sensor for directly sensing the temperature of refrigerant entering said expansion means and connecting a resistance electrically in series with said sensor;
(c) flowing an electrical current through said resistance and said sensor and heating the refrigerant sufficiently to cause boiling at said sensor;
(d) detecting the voltage drop across said resistance when said current is flowing; and
(e) de-energizing said pump means when said detected voltage drop is greater than a first predetermined value.

11. The method defined in claim 10, wherein said step of providing a sensor includes the step of providing a thermistor in the flow of refrigerant to said expansion means.

12. The method defined in claim 10, wherein said step of energizing said fan includes the step of comparing said detected voltage with a reference voltage.

13. The method defined in claim 10, wherein said step of de-energizing said pump means includes the step of comparing said detected voltage with a reference value.

14. The method defined in claim 10, further comprising the step of de-energizing said fan when said detected voltage drop is greater than a second predetermined value less than said first predetermined value.

* * * * *